United States Patent Office 3,522,080
Patented July 28, 1970

3,522,080
PROCESS FOR HARDENING THE SURFACES
OF SYNTHETIC MATERIALS
Karl Dietzel, Krefeld-Uerdingen, and Gunter Peilstocker, Krefeld-Bockum, Germany, assignors to Farbenfabriken Bayer Aktiengesellschaft, Leverkusen, Germany, a corporation of Germany
No Drawing. Continuation-in-part of application Ser. No. 633,375, Apr. 25, 1967. This application July 18, 1968, Ser. No. 745,665
Claims priority, application Germany, Apr. 29, 1966, F 49,057
Int. Cl. C23c 13/04; B44d 1/16
U.S. Cl. 117—232
9 Claims

ABSTRACT OF THE DISCLOSURE

A process for hardening the surface of a synthetic material which includes vapor deposition of a least fifty successive layers of silicon oxide onto the surface of the synthetic material in a high vacuum in the presence of oxygen to achieve a coating thickness of 2 to 5 microns.

---

This invention relates to a process for hardening the surfaces of synthetic materials, and more particularly, to a process for hardening such surfaces using vapor deposition, and this application is a continuation-in-part of our application Ser. No. 633,375, filed on Apr. 25, 1967, now abandoned.

It is known that the surfaces of some synthetic materials can be hardened by depositing thereon a layer of $SiO_x$, wherein $x$ has a value of about 1 to 2. Such surface-hardening layers which are glass-clear and transparent primarily render the synthetic materials scratch resistant. Vapor deposition processes for applying the $SiO_x$ layers are usually carried out in a high vacuum ($10^{-4}$ to $10^{-6}$ mm. Hg) and in the presence of oxygen. For example, in his paper "Probleme bei der Herstellung dünner Schichten," published in "Vakuum Technik," vol. 15, 1966, No. 1, pages 1–8, in the left-hand column on page 6, W. Reichelt mentions that it is possible to use this method to produce surprisingly thick (about 2 to $5\mu$) layers of $SiO_2$ on polycarbonates and methacrylic resins. Such $SiO_2$ layers initially adhere remarkably fast to the surfaces of the plastics to which they are applied, such as polycarbonates and methacrylic resins, for example, even though the thermal expansion of these materials is substantially greater than that of the $SiO_2$ layers.

Notwithstanding the initial strong adherence achieved between the $SiO_2$ layer and the synthetic surface to which it is applied, with methacrylic resins, for example, the adhesion eventually disappears. In the case of polycarbonates, the adhesion is somewhat more stable but, even so, is unable to withstand severe weather conditions. For example, in the Weather-Ometer test in which a surface is sprayed with water at regular time intervals at constantly changing temperatures and under exposure to strong ultra-violet irradiation, the adhesion between the polycarbonate and the $SiO_2$ layer gives way. Further, the laminate is unable to withstand prolonged testing for scratch resistance. As a consequence, such materials are not suitable for those applications which require resistance to weathering and stability against the abrasions of everyday wear and tear by the general public.

It is therefore an object of this invention to provide a process for hardening the surfaces of synthetic materials which will yield a product devoid of the foregoing disadvantages.

Another object of this invention is to provide an improved method for hardening the surfaces of synthetic materials by the vapor deposition of $SiO_x$, in which $x$ has a value of about 1 to 2, under a high vacuum and in the presence of oxygen.

Still another object of this invention is to provide an improved method for hardening the surfaces of synthetic materials with suitable hardening layers of $SiO_x$ having a combined thickness of from about 2 to about $5\mu$.

A further object of this invention is to provide a synthetic resin having hardened surfaces which satisfy the most rigorous requirements for resistance to weathering and scratching.

A still further object of this invention is to provide synthetic plastics having hardened surfaces which are suitable for the fabrication of windows and mobile homes, for example.

The foregoing objects and others which will become apparent from the following description are accomplished in accordance with this invention, generally speaking, by a process which comprises the vapor deposition of about 50 successive layers of $SiO_x$ onto the surface of a synthetic material, $x$ having a value of about 1 to 2, at a mean condensation rate of $SiO_x$ of about 90 to 110 A./sec. in the presence of oxygen until a layer thickness of about 2 to about $5\mu$ is achieved while the surface being coated is uniformly moved in a steam jet containing a partial pressure of $SiO_x$ of about $1\times10^{-2}$ mm. Hg, $SiO_2$ having been vaporized with an electron beam vaporizer source at a density of energy of about 5 to about 15 kw./cm.$^2$ and an effective evaporation surface of $SiO_2$ of about 0.3 to about 0.6 cm.$^2$, wherein the synthetic material will not soften in the course of the vapor deposition and has an undetectable concentration of components having vapor pressure of more than $10^{-5}$ at 120° C., and not more than about 30 percent of the surface of the synthetic material to be treated being covered by a monomolecular layer of organic foreign substances.

The partial pressure of the $SiO_x$ referred to is measured in the steam jet with a thermoelectric manometer at a distance of about 25 cm. from the center of the evaporating $SiO_x$ surface. In carrying out the process, it is generally expedient to discharge the synthetic materials to be treated electrostatically before the vapor deposition process is begun.

The condition that those synthetic materials employed in the process of this invention are those which do not soften during the vapor deposition process, that is, at temperatures of up to about 120° C. to which at least the surfaces being treated are subjected, eliminates all those synthetic materials from the process which have too low a softening point.

Further, the condition that those synthetic materials are to be used which have a content of components, if any, having a vapor pressure of more than about $10^{-5}$ mm. Hg at 120° C. which is not detectable, eliminates all those synthetic materials from the process which still contain volatile components such as, for example, monomers, plasticizers, solvents, water and the like. In this regard, the content of the volatile components can be considered not detectable when an increase of the rise in pressure, compared with a blank, over 1 sq. m. of the surface of the synthetic material during storage at 120° C. and an initial pressure of $10^{-5}$ mm. Hg in a closed vessel of not more than 100 liters capacity, is no longer measurable. If necessary the synthetic material to be treated must be pretreated immediately before the vapor deposition process is carried out in order to remove the volatile components. The pretreatment may be accomplished, for example, by heating the synthetic material for example, in a high vacuum drier at a minimum temperature of about 120° C. and below the decomposition temperature of the synthetic material until all of the volatile components have been removed. Therefore, it is not sufficient to merely free only the external layers of the synthetic material from these volatile components since components of this type will gradually diffuse from the interior to the external layers of the synthetic material and eventually destroy the adhesion of the hardening layer to it. On the other hand, however, a subsequent reabsorption of moisture is not detrimental.

Any suitable synthetic material as defined herein may be used in the process of this invention, either with or without the pretreatment described above. Some such suitable synthetic materials are, for example, linear thermoplastic polyesters which are free from plasticizers such as, for example, terephthalic acid ethylene glycol polyesters, as described, for example, in the British patent specification 578,079; polycarbonates having a sufficiently high softening point, especially those based on aromatic dihydroxy compounds, and particularly, bis-(hydroxyphenyl) - alkanes, -sulphones, -ethers, -sulphides and the like including thoese described in U.S. Pats. 3,028,365; 2,999,835 and the like; linear thermoplastic polyarylene polyethers such as, for example, the polyether polysulphone with structural units of the formula

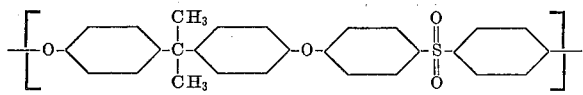

as described for example, in the Dutch patent application No. 6408130 the polyether of 2,6-dimethylphenol, as described, for example, in the Dutch patent application No. 6509470 and in the French Pat. No. 1,440,527, and the like; cross-linked synthetic materials such as epoxide resins hardened by acid anhydrides or amines, as described, for example, in U.S. Pat. 2,642,239, polymeric bis-allyl carbonates including such as described in U.S. Pat. Nos. 2,370,565, 2,384,115, 2,385,930, 2,385,933, 2,455,652, 2,455,653 and 2,587,437, methacrylic resins, as described, for example in U.S. Pat. 1,829,208, and the like.

Molded articles, such as foils, plates, rods, tubes, lenses and the like, made of these synthetic materials may be suitably employed in the practice of this invention as well as objects of any kind which are coated with lacquer films. The lacquer films can consist, for example, of polyurethane lacquers, ricinene alkyd resin/aminoplast combination lacquers, epoxide resin lacquers which are hardened by acid or amine or by urea, melamine resin and isocyanate, lacquers based on epoxy esters, silicone resin lacquers, cyclised rubber lacquers, acrylic resin lacquers and the like.

Since a cover of an organic substance such as a plasticizer or a solvent on the surface of the synthetic material prevents the adhesion of the hardening layer, the surface to be treated should be free from such foreign substances to the greatest possible extent. The limit for a cover of such foreign substances which can just be tolerated, if necessary, has been established at 30 percent of the surface to be treated of a monomolecular layer. This means, for example, that molded articles of synthetic resins must have been produced without the use of release agents and the like. Even the wiping of the surface of the synthetic material with a solvent, for example, can be detrimental. Care must also be taken that as few particles of organic substances as possible settle on the surface to be hardened. For this reason it is expedient to discharge the synthetic materials electrostatically by means of an ion spray gun, for example, before the vapor deposition process is carried out. The interior of the vaporization device must also be kept as free as possible from oil vapors which may originate from packings or from the pumps.

As mentioned above, it has also been found that the vapor deposition process itself must be carried out under certain controlled conditions. The first requirement is that $SiO_2$ is evaporated with an electron beam vaporizer source at an energy density of about 5 to 15 kw./sq. cm. and an effective evaporation surface of $SiO_2$ of about 0.3 to 0.6 sq.cm. It is inevitable that a certain dissociation of $SiO_2$ to $SiO_x$ takes place, $x$ having a value of between 1 and 2. Since the oxygen evolved in this process is preferentially sucked off by pumps, a sufficient supply of oxygen should be provided so that the material deposited as the hardening layer again essentially consists of $SiO_2$. This is a desirable consideration since more or less colored layers would otherwise be obtained because the light absorption of silicon increases as the degree of oxidation decreases.

Another requirement for the vapor deposition process of this invention is a minimum partial pressure of the $SiO_x$ vapor in the steam jet in order to overcompensate by a suitably strong impact of $SiO_x$ particles for any covering of foreign particles on the surface of the object which cannot be completely avoided even with the utmost care such as, for example, oil particles or residual gases. The partial pressure of $SiO_x$, measured in the steam jet with a thermoelectric manometer at a distance of 25 cm. from the center of the evaporating $SiO_2$ surface, should therefore be higher than $1 \times 10^{-2}$ mm. Hg.

In carrying out the instant process it is desirable that the surface of the object to be treated by vapor deposition should be hit by the $SiO_x$ jet as uniformly as possible and, if possible, at an angle of about 90° in order to achieve a uniform rate of growth of the hardening layer throughout. Layers of uneven thickness are the cause of tensions which result in a coating having poor stability. A uniform rate of growth of the hardening layer is achieved by constantly moving the object in the steam jet and/or electron beam vaporizer source.

Finally, it is also necessary that the hardening layer grows at a certain speed. The condensation rate of $SiO_x$ should therefore amount to between about 90 and 110 A./sec. This can be achieved by appropriately harmonizing the distance of the surface to be treated from the evaporating $SiO_2$ surface and the time of residence during which the surfaces to be treated face the $SiO_x$ jet. Moreover, the condensation of $SiO_x$ on the surfaces to be treated should take place in at least 50 successive layers.

EXAMPLE 1

A vapor deposition device of conventional design and 500 litres capacity is fitted with a dosing valve arranged tangentially to the boiler wall and with a second dosing valve arranged vertically to the direction of suction of the diffusion pump; for example, in the boiler lid. The two valves can be so regulated to achieve a constant preliminary pressure of about $1 \times 10^{-4}$ mm. Hg, measured with a Penning vacuum meter, adjusted in the vicinity of the ratched valve of the diffusion pump when that pump works at full capacity.

Furthermore, a Root's pump filled with previously used diffusion pump oil is connected before the slide valve forepump. The pipe line from the forepump to the boiler is so dimensioned that any oil vapors can be deposited in the tube. If necessary, a molecular sieve or active charcoal filter is inserted in this pipe line.

The electron beam vaporizer source used is fitted with a hair pin cathode of the type of the so-called oblique ray guns with a ray deflection of about 180°, and with an $SiO_2$ anode having an effective evaporation surface of 0.6 sq. cm. This anode is so devised that $SiO_2$ is supplied at the rate of its evaporation.

A polycarbonate plate is extruded from a commercial Bisphenol A polycarbonate granulate by means of a slot die. Immediately after the extrusion it is electrostatically discharged by means of an ion spray gun and placed into a metal frame in such a manner that it is cylindrically bent with an inside height of about 10 cm. The resulting bent polycarbonate plate has dimensions of 0.1 x 60 x 160 cm. and it is arranged at a distance of about 40 cm. from the electron beam vaporizer source. The plate is then placed without delay into the vapor deposition device.

If this is not possible, the plate is pretreated for at least 2 hours at 120° C. and 0.1 mm. Hg in a vacuum dried in whose vacuum pipe line to the pump an active charcoal filter has been inserted, and is again discharged with an ion spray gun before it is placed in the vapor deposition device.

The vapor deposition device is then closed and the pressure reduced to about $1 \times 10^{-5}$ mm. Hg. The dosing valves mentioned above are then regulated so a constant pressure of about $1 \times 10^{-4}$ mm. Hg is achieved and sufficient amounts of oxygen are present constantly. The electron beam vaporizer source is then passed to and fro below the surface to be treated at a uniform rate of about 20 cm./sec.; the cathode heating is switched on and adjusted to a current consumption of about 30 A. The high voltage is then slowly raised until the $SiO_2$ has been ignited and begins to evaporate. The cathode heating is then reduced as far as possible and the electron beam vaporizer source adjusted to an energy density of about 10 kw./sq. cm. of the $SiO_2$ surface. The partial pressure of $SiO_x$ in the steam jet amounts to about $1 \times 10^{-2}$ mm. Hg, measured with a thermoelectric manometer at a distance of about 25 cm. from the center of the evaporating $SiO_2$ surface. The mean condensation rate of $SiO_x$ on the polycarbonate surface amounts to about 100 A./sec.

Vapor deposition on the polycarbonate plate is allowed to continue under these conditions for about 6 minutes. During this period of time about 50 successive layers of $SiO_x$ are deposited on the polycarbonate surface yielding an overall hardening layer having a thickness of about 3.5. This layer is uniform over the whole plate, completely colorless, of glass-clear transparency, very hard and resistant to scratch and weather. This process may be further improved by vaporizing, instead of pure quartz, a mixture of 95 to about 98.5 percent by weight silicon dioxide and about 5 to about 1.5 percent by weight zinc oxide, zirconium oxide or antimony oxide, but preferably chromium oxide, or mixtures of these oxides, a corresponding mixture being deposited on the surfaces of the synthetic materials.

By modification of the process there is achieved an even better improvement of the synthetic materials, particularly in respect of their stability to strong changes of temperature, for example, in the range between $+20$ and $+100°$ C., and to moist air containing sulphur dioxide. For example, the surfaces improved only by vapour-deposition of a quartz layer, admittedly, quite satisfactorily withstand the stresses of the Weather-Ometer test, but under the influence of repeated rapid changes of temperature between about 20° C. and about 100° C. fine hair cracks may occur in the vapour-deposited layer. This is not the case with the finishing layers produced according to the present improved process.

In order to achieve the desired improvement of the surface finish, the content of the aforesaid metal oxides in relation to the silicon oxide should not be less than about 1.5 percent by weight, referred to the oxide mixture. On the other hand, the properties of the surface finishes are impaired if a content of about 5 percent by weight is exceeded.

The mixture to be vaporized may consist of a physical mixture of fine-grained silicon dioxide and fine-grained foreign oxides, which has previously been calcined at a temperature of up to about 1000° C. However, the powder mixture may also be melted into a block prior to application, by heating it to temperatures above about 1800° C.

A particularly intimate mixture of the silicon dioxide with foreign metal oxides can be attained by simultaneous precipitation from aqueous solutions, for example, of the corresponding chlorides, i.e. e.g. the silicon tetrachloride, e.g. with ammonia, and calcinating or melting the precipitates.

EXAMPLE 2

The process is carried out as described in Example 1 but the quartz is replaced with a mixture of 95 percent by weight of quartz sand and 5 percent by weight of chromium oxide the maximum particle size of which is about 50 to about $100\mu$ and which was previously calcined at about 1000° C. The finishing layer vapor-deposited in this way on the surface of the polycarbonate sheet is completely colourless, clear-transparent, and withstands, for example, the following conditions:

(1) Test for stability to change of temperature according to DIN 52,304
(2) Heating three times at 100° C. for 30 minutes with intermediate storage at 20° C. for 30 minutes
(3) Test according to DIN 50,016 (changing tropical climate, 7 days)
(4) Kosternich test according to DIN 50,018 (8 hours, 40° C., 95% relative humidity $+2$ litres $SO_2$ per 300 litres or air).

It is only with the cooperation of all of the aforesaid conditions that the aims of the instant process can be achieved and the surfaces of synthetic materials can be hardened with permanently adhered and durable coatings which are scratch and weather resistant. The synthetic resins of this invention with their hardened surfaces may be used in any application for which the resins themselves are suitable as well as in those other applications which require scratch and weather resistance. For example, the synthetic materials may be used in the fabrication of mobile homes, prefabricated buildings, as a glaze to impart weather resistance to any surface which is subjected to the ravages of weathering, windows, sight glasses, pipes and the like.

It is to be understood that any of the components and conditions mentioned as suitable herein can be substituted for its counterpart in the foregoing examples and that although the invention has been described in considerable detail in the foregoing, much detail is solely for the purpose of illustration. Variations can be made in the invention by those skilled in the art without departing from the spirit and scope of the invention.

What is claimed is:

1. A process for hardening the surfaces of synthetic materials which comprises the vapor deposition of at least 50 successive layers of $SiO_x$ onto the surface of a synthetic material, $x$ having a value of about 1 to 2, at a mean condensation rate of $SiO_x$ of about 90 to 110 A./sec. in the presence of oxygen until a total layer thickness of about 2 to about $5\mu$ is achieved while the surface being coated is uniformly moved in a steam jet containing a partial pressure of $SiO_x$ of about $1 \times 10^{-2}$ mm. Hg, $SiO_2$ having been vaporized with an electron beam vaporizer source at an energy density of about 5 to about 15 kw./cm.$^2$ and an effective evaporation surface of $SiO_2$ of about 0.3 to about 0.6 cm.$^2$, wherein the synthetic material will not soften in the course of the vapor deposition and has an undetectable concentration of components having a vapor pressure of more than $10^{-5}$ mm. Hg at 120° C., and not more than about 30 percent of the surface of the synthetic material to be treated being covered by a monomolecular layer of organic substances foreign to the substrate.

2. The process of claim 1 wherein the synthetic material will not soften at temperatures of up to about 120° C.

3. The process of claim 1 wherein the synthetic material to be treated is pretreated by heating it below its decomposition temperature until the volatile components have been removed.

4. The process of claim 1 wherein the synthetic material to be treated is a polycarbonate.

5. The process of claim 1 wherein the synthetic material to be treated is selected from the group consisting of a terephthalic acid ethylene glycol polyester, a polycarbonate, a polyarylene polyether, an epoxy resin and a methacrylic resin.

6. The process of claim 1 wherein the surface to be hardened is a lacquer film.

7. The process of claim 1 wherein the surface to be treated is pretreated by discharging it electrostatically.

8. The process of claim 1 wherein the surface of the synthetic material is hit uniformly by the $SiO_x$ jet at an angle of about 90°.

9. Process according to claim 1 wherein a mixture of about 95 to about 98.5 percent by weight of silicon dioxide and about 5 to about 1.5 percent by weight of chromium oxide, zinc oxide, zirconium oxide, antimony oxide, or mixtures of these oxides is vaporized.

References Cited

UNITED STATES PATENTS

| | | | |
|---|---|---|---|
| 2,432,538 | 12/1947 | Ogle et al. | 117—106 X |
| 2,463,791 | 3/1949 | Morgan | 117—106 X |
| 2,622,041 | 12/1952 | Godley | 117—107.1 X |
| 2,920,002 | 1/1960 | Aunarter | 117—106 X |
| 2,952,559 | 9/1960 | Nadeau | 117—93.4 X |
| 3,206,323 | 9/1965 | Miller et al. | 117—93.4 X |

FOREIGN PATENTS 909,503   10/1962   Great Britain.

OTHER REFERENCES

O'Bryan: Review of Scientific Instruments, vol. 5, March 1934, pages 125 and 126 relied upon.

Holland: Thin Film Microelectronics, 1965, pages 27, 46 and 53 relied upon.

Reichelt: Vakuum-Technik, vol. 15, January 1966, pages 1 to 8 relied upon.

ALFRED L. LEVITT, Primary Examiner

W. E. BALL, Assistant Examiner